United States Patent
Ishikawa et al.

(10) Patent No.: US 12,494,612 B2
(45) Date of Patent: Dec. 9, 2025

(54) METHOD OF BONDING OPERATION WIRE AND MEDICAL EQUIPMENT

(71) Applicant: OLYMPUS CORPORATION, Tokyo (JP)

(72) Inventors: Takehiro Ishikawa, Hachioji (JP); Keiichi Asami, Hachioji (JP); Tomonori Imamura, Hino (JP)

(73) Assignee: OLYMPUS CORPORATION, Tokyo (JP)

(*) Notice: Subject to any disclaimer, the term of this patent is extended or adjusted under 35 U.S.C. 154(b) by 373 days.

(21) Appl. No.: 18/198,498

(22) Filed: May 17, 2023

(65) Prior Publication Data

US 2023/0411915 A1 Dec. 21, 2023

(30) Foreign Application Priority Data

Jun. 9, 2022 (JP) ................................. 2022-093765

(51) Int. Cl.
*H01R 43/02* (2006.01)
*A61B 1/00* (2006.01)
*H01R 4/02* (2006.01)

(52) U.S. Cl.
CPC ........ *H01R 43/0221* (2013.01); *A61B 1/0011* (2013.01); *A61B 1/00114* (2013.01); *H01R 4/024* (2013.01)

(58) Field of Classification Search
CPC .... H01R 43/0221; H01R 4/024; H01R 13/03; A61B 1/0011; A61B 1/00114; A61B 1/00087; A61B 1/018; A61B 17/00234; A61B 18/14

USPC ............................................. 606/46; 600/104
See application file for complete search history.

(56) References Cited

U.S. PATENT DOCUMENTS

2015/0031949 A1* 1/2015 Tomiyama ......... A61B 17/3478
264/299

FOREIGN PATENT DOCUMENTS

| JP | S6397153 A | 4/1988 | |
| JP | 2002124359 A | 4/2002 | |
| JP | 3463790 B2 | 11/2003 | |
| JP | 2008251208 A * | 10/2008 | |
| WO | WO-2012169630 A1 * | 12/2012 | ............ A61M 25/09 |

(Continued)

OTHER PUBLICATIONS

Translation of JP2008-251208A (Year: 2008).*
Japanese Office Action dated Jun. 17, 2025 received in 2022-093765.

*Primary Examiner* — Beverly M Flanagan
(74) *Attorney, Agent, or Firm* — Scully, Scott, Murphy & Presser, P.C.

(57) ABSTRACT

Provided is a method of bonding an operation wire used in a medical equipment. The method includes: locally heating an adjacent region of a bonding region of an operation wire to generate an oxide in the adjacent region of the operation wire; coating the bonding region and the adjacent region with flux to remove an oxide in the bonding region and the oxide in the adjacent region; inserting a bonding end portion of the operation wire into a through-hole of a coupling material; injecting a melted bonding material into between the coupling material and the operation wire to integrally bond the coupling material and the operation wire such that the oxide remaining in the adjacent region prevents wet-spreading of the bonding material.

9 Claims, 6 Drawing Sheets

(56) References Cited

FOREIGN PATENT DOCUMENTS

WO    WO-2018062416 A1 *   4/2018   ............. A61B 17/22

* cited by examiner

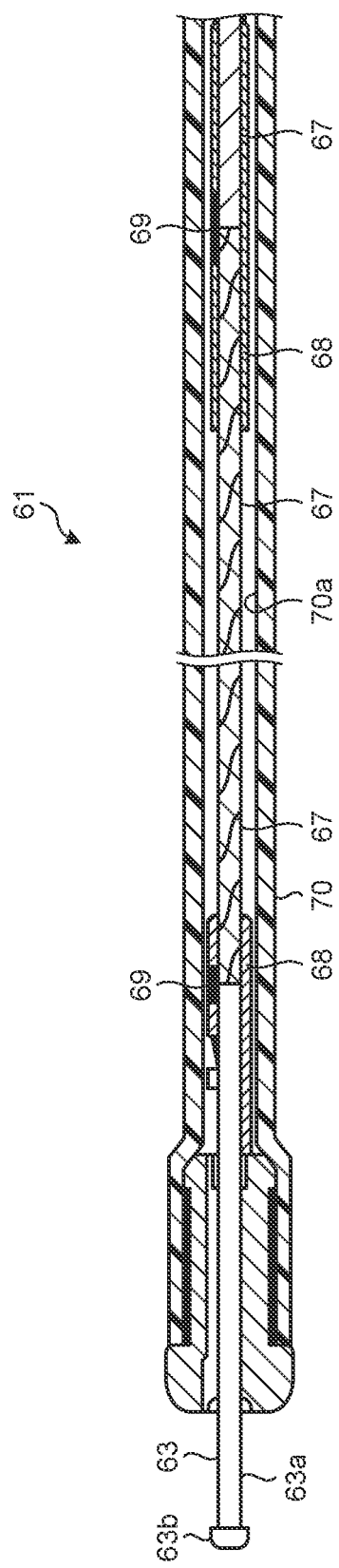

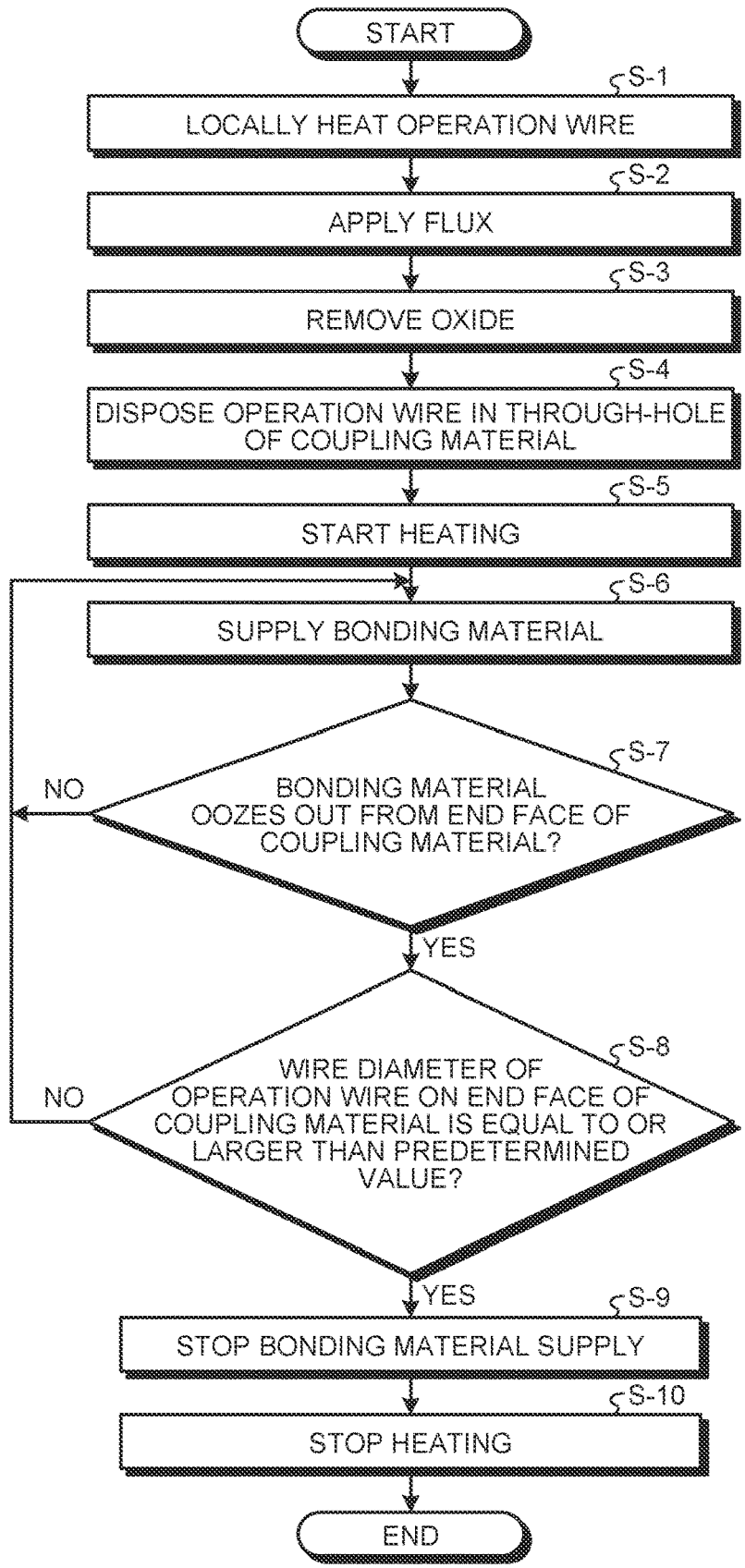

METHOD OF BONDING OPERATION WIRE AND MEDICAL EQUIPMENT

CROSS REFERENCES TO RELATED APPLICATIONS

This application is based upon and claims the benefit of priority from Japanese Patent Application No. 2022-093765, filed on Jun. 9, 2022, the entire contents of which are incorporated herein by reference.

BACKGROUND

1. Technical Field

The present disclosure relates to a method of bonding an operation wire and a medical equipment.

2. Related Art

In the medical field, an endoscope system has been used when an organ of a subject such as a patient is observed. The endoscope system belongs to medical equipment. As such an endoscope system, an endoscope system including an insertion section, an imaging element, and an external device is known. The insertion section is formed in an elongated shape having flexibility and is inserted into a body cavity of the subject. The imaging element is provided at the distal end of the insertion section and captures an in-vivo image. The external device is connected to the insertion section via a cable, performs image processing for the in-vivo image captured by the imaging element, and causes a display unit or the like to display the in-vivo image.

A treatment instrument used in the endoscope system explained above includes a functional portion, an operation wire, and a flexible sheath. The functional portion is formed in a substantially linear shape and is a member for applying a predetermined treatment. The operation wire is connected to the functional portion. The flexible sheath is a tubular member that is provided on the inside of the insertion section and through which the functional portion and the operation wire are retractably inserted. Examples of the functional portion include a high-frequency knife, basket forceps, and a surgical needle (a biopsy needle). The high-frequency knife excises a biological tissue such as a mucous membrane. The basket forceps have a basket shape and capture a tissue or the like inside a body in an internal space formed by the basket. The surgical needle (the biopsy needle) is capable of puncturing a wall surface in a body cavity to collect cells or tissues through a tubular hollow space.

The functional portion and the operation wire are coupled using a coupling material such as a metal pipe made of stainless steel such as SUS and a bonding material such as wax or solder. Similarly, operation wires are connected to each other using the coupling material and the bonding material. Specifically, the functional portion and the operation wire are respectively inserted from both ends of the coupling material and the end portions of the functional portion and the operation wire are brought into contact or close contact with each other on the inside the coupling material. A connecting portion of the functional portion and the operation wire brought into contact or close contact is in a state in which the connecting portion is covered by the coupling material. In this covered state, a melted bonding material is injected into the inside of the coupling material to integrally bond the coupling material, the functional portion, and the operation wire to thereby connect the functional portion and the operation wire.

The presence of an oxide on the surfaces of the operation wire and the functional portion hinders the bonding. For this reason, the bonding is performed after the operation wire and the functional portion are coated with flux and the oxide is removed. The extra bonding material overflowing from the end portion of the coupling material is called fillet. Here, the length of the fillet formed at the end portion of the coupling material sometimes differs depending on an application region of the flux, variations of gaps between the operation wire and the functional portion and the coupling material, a supply amount of the bonding material, and the like. FIGS. 6A and 6B are diagrams for explaining a bonding method of related art. A bonding material 69a is melted and introduced into a coupling material 68 from a supply hole 68a in the center of the coupling material 68. Two operation wires 67 are housed on the inside of the coupling material 68 in a state in which the end faces of the operation wires 67 are in contact. The bonding material 69a overflowing from both the ends of the coupling material 68 hardens to be a bonding material 69b. The hardened bonding material 69b is the fillet. At this time, length from an end to an end of the fillet (the hardened bonding material 69b) formed at both the ends of a coupling material 68 is a hard length. As illustrated in FIG. 6A, when the bonding material 69b oozes out long from the end portion of the coupling material 68, the hard length is large. If the hard length is too long, a bending amount is insufficient. On the other hand, as illustrated in FIG. 6B, if the bonding material 69b does not ooze out to the end portion of the coupling material 68 and the fillet is not formed, the hard length is small. On the other hand, since there is no slope by the fillet, a step is formed. A deficiency occurs in that wire insertion cannot be smoothly performed due to the step between the end portion of the coupling material 68 and the operation wire 67.

Japanese Patent No. 3463790 discloses a wiring board in which a tantalum oxide layer is provided as means for preventing wet-spreading of melted wax in an appropriate position on a conductive circuit to which an electronic component is bonded by the melted wax.

SUMMARY

In some embodiments, provided is a method of bonding an operation wire used in a medical equipment. The method includes: locally heating an adjacent region of a bonding region of an operation wire to generate an oxide in the adjacent region of the operation wire; coating the bonding region and the adjacent region with flux to remove an oxide in the bonding region and a part of the oxide in the adjacent region; inserting a bonding end portion of the operation wire into a through-hole of a coupling material to come contact with or come near to a bonding end portion of another member; injecting a melted bonding material into between the coupling material and the operation wire to integrally bond the coupling material and the operation wire such that the oxide remaining in the adjacent region prevents wet-spreading of the bonding material.

In some embodiments, a medical equipment includes: an operation wire inserted into a through-hole of a coupling material, an end portion of the operation wire being bonded to the coupling material by a bonding material, the bonding material being formed in a cone shape at an end portion of the coupling material, the operation wire including a bonding region bonded by the bonding material and a region adjacent to the bonding region, the adjacent region including a wet-spreading preventing region for the bonding material, the wet-spreading preventing region being made of oxide.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 2 is a sectional view for explaining a configuration of a treatment instrument distal end according to the embodiment of the disclosure;

FIG. 3 is a diagram illustrating a flow of a method of bonding an operation wire according to the embodiment of the disclosure;

DETAILED DESCRIPTION

Figure 1:
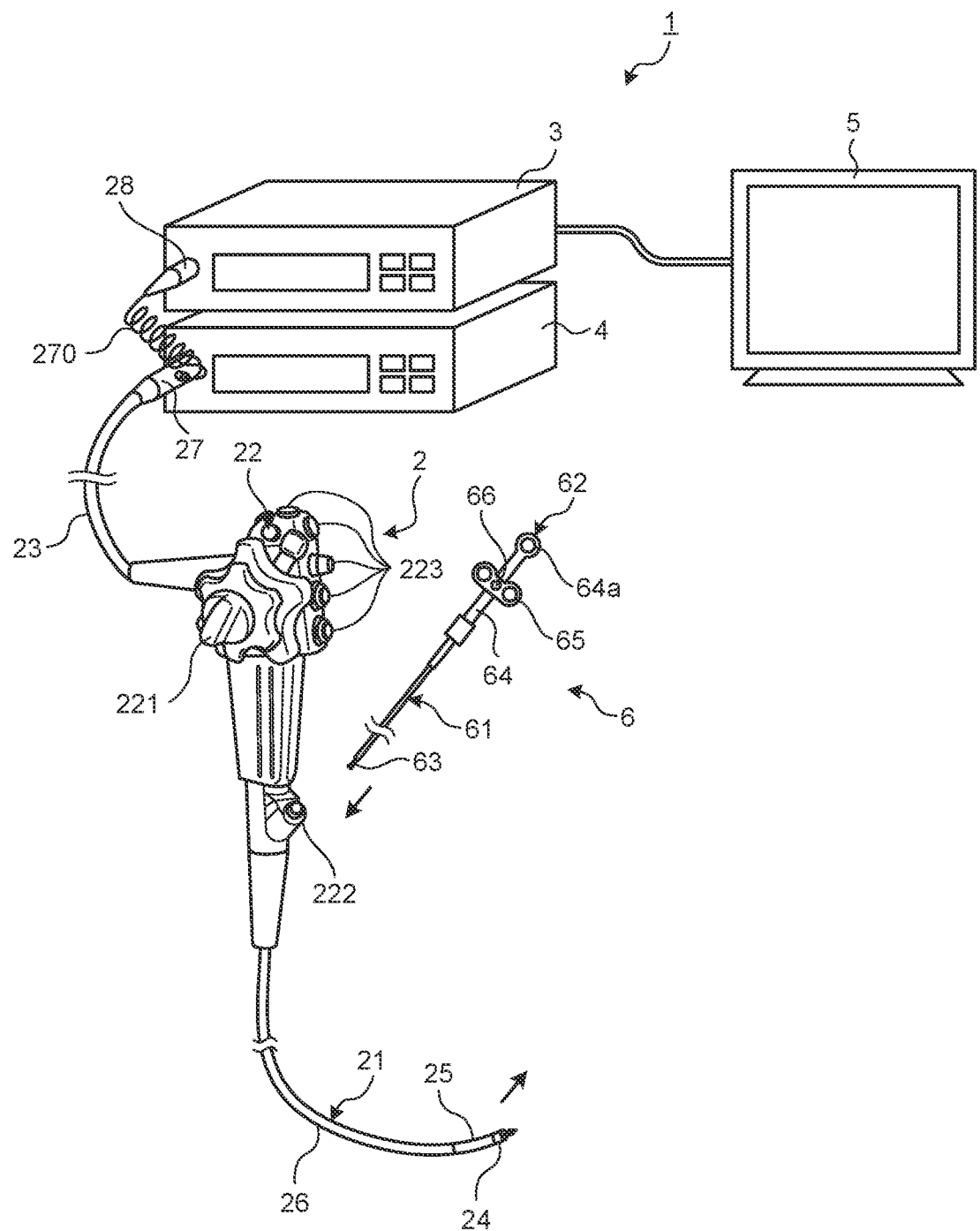
FIG. 1 is a diagram illustrating a schematic configuration of an endoscope system according to an embodiment of the disclosure.

As a mode for carrying out the disclosure (hereinafter referred to as "embodiment"), a medical endoscope system that captures and displays an image in a body cavity of a subject such as a patient is explained below. The disclosure is not limited by the embodiment. Further, in the description of the drawings, the same portions are denoted by the same reference numerals and signs. Furthermore, it is necessary to note that the drawings are schematic, and relations between thicknesses and widths of members, ratios of the members, and the like can be different from reality. Among the drawings, portions different in dimensions and ratios can be included.

Embodiment

FIG. 1 is a diagram illustrating a schematic configuration of an endoscope system 1 according to an embodiment of the disclosure. As illustrated in FIG. 1, the endoscope system 1 includes an endoscope 2, a control device 3, a light source device 4, a display device 5, and a treatment instrument 6. The endoscope 2 captures an in-vivo image of a subject by inserting a distal end portion into a body cavity of the subject. The control device 3 applies predetermined image processing to an in-vivo image captured by the endoscope 2 and integrally controls the operation of the entire endoscope system 1. The light source device 4 generates illumination light to be emitted from the distal end of the endoscope 2. The display device 5 displays the in-vivo image subjected to the image processing by the control device 3. The treatment instrument 6 includes a functional portion at the distal end thereof and is inserted through the endoscope 2 and comes out from the distal end of the distal end portion 24.

The endoscope 2 includes an insertion section 21, an operation section 22, and a universal cord 23. The insertion section 21 has an elongated shape having flexibility. The operation section 22 is connected to the proximal end side of the insertion section 21 and receives input of various operation signals. The universal cord 23 extends from the operation section 22 in a direction different from a direction in which the insertion section 21 extends. The universal cord 23 incorporates various cables connected to the control device 3 and the light source device 4.

The insertion section 21 includes a distal end portion 24, a bending section 25, and a flexible tube section 26. The distal end portion 24 incorporates an imaging element. The bending section 25 is a bendable part including a plurality of bending pieces. The flexible tube section 26 is a long part connected to the proximal end side of the bending section 25 and having flexibility.

The imaging element receives light from the outside, photoelectrically converts the light into an electric signal, and performs predetermined signal processing. The imaging element is realized by using, for example, a CCD image sensor or a CMOS image sensor.

An assembly cable in which a plurality of signal lines for transmitting and receiving electric signals to and from the control device 3 are bundled is connected between the operation section 22 and the distal end portion 24. The plurality of signal lines include a signal line for transmitting a video signal output by the imaging element to the control device 3 and a signal line for transmitting a control signal output by the control device 3 to the imaging element.

The operation section 22 includes a bending knob 221, a treatment instrument insertion section 222, and a plurality of switches 223. The bending knob 221 bends the bending section 25 in the up-down direction and the left-right direction. The treatment instrument insertion section 222 inserts the treatment instrument 6 such as biological forceps, a laser knife, or a test probe into the body cavity. The plurality of switches 223 are operation input sections for inputting operation instruction signals of peripheral equipment such as air feeding means, water feeding means, and gas feeding means in addition to the control device 3 and the light source device 4.

The universal cord 23 incorporates at least a light guide and an assembly cable. A connector section 27 and an electric connector section 28 are provided at an end portion of the universal cord 23 on a side different from a side connected to the operation section 22. The connector section 27 is attachable to and detachable from the light source device 4. The electric connector section 28 is electrically connected to the connector section 27 via a coil cable 270 formed in a coil shape and is attachable to and detachable from the control device 3.

The control device 3 generates an in-vivo image to be displayed by the display device 5 based on an image signal output from the distal end portion 24. The control device 3 performs, for example, white balance (WB) adjustment processing, gain adjustment processing, y correction processing, D/A conversion processing, format change processing, and the like.

The light source device 4 includes, for example, a light source, a rotary filter, and a light source control unit. The light source is configured using a white LED (Light Emitting Diode), a xenon lamp, or the like and generates white light under the control of the light source control unit. The light generated by the light source is irradiated from the distal end of the distal end portion 24 via the light guide.

The display device 5 has a function of receiving the in-vivo image generated by the control device 3 from the control device 3 via a video cable and displaying the in-vivo image. The display device 5 is configured using, for example, liquid crystal or organic EL (Electro Luminescence).

The treatment instrument 6 includes an insertion section 61 that can be inserted through the treatment instrument insertion section 222 of the endoscope 2 and an operation section 62 provided at the proximal end of the insertion section 61. A functional portion 63 is provided at the distal end of the insertion section 61. In the example in the present embodiment, an example is explained in which the functional portion 63 is a high frequency knife capable of excising a living tissue by energizing a high frequency current.

The operation section 62 includes an operation section main body 64 in which a support section 64a is provided at an end of an elongated tube and a wire operation handle 65 slidable in the axial direction with respect to the operation section main body 64. In the wire operation handle 65, a connector section 66 to which a cord extending from a high frequency generation device that supplies a high frequency current to the functional portion 63 is electrically connected is provided.

FIG. 2 is a partial sectional view enlarging and illustrating the distal end portion of the insertion section 61 illustrated in FIG. 1. As illustrated in FIG. 2, the insertion section 61 includes a flexible sheath 70, a functional portion 63, an operation wire 67, and a coupling material 68. The functional portion 63 is provided to be able to protrude and retract from the distal end of the flexible sheath 70. The operation wire 67 is inserted through the flexible sheath 70 and connected to the functional portion 63. The coupling material 68 connects the functional portion 63 and the operation wire 67 or connects the operation wires 67 to each other.

The functional portion 63 includes a rod-shaped electrode section 63a formed in a rod shape and a distal end electrode section 63b provided at the distal end of the rod-shaped electrode section 63a. The rod-shaped electrode section 63a and the distal end electrode section 63b are integrally formed of an electrically conductive material such as stainless steel (for example, SUS304) by, for example, cutting. Alternatively, the rod-shaped electrode section 63a and the distal end electrode section 63b may be formed of different materials.

The operation wire 67 is a stranded wire (for example, seven strands) made of an electrically conductive material such as stainless steel (for example, SUS304) and is inserted through an insertion hole 70a provided in the flexible sheath 70 to be movable in the axial direction. The operation wire 67 is electrically connected to the functional portion 63 on the distal end side and is electrically connected to the connector section 66 on the proximal end side. As the material of the operation wire 67, nickel titanium can also be adopted instead of stainless steel.

The functional portion 63 and the operation wire 67 are electrically connected to each other via the coupling material 68 and each of the functional portion 63 and the operation wire 67 is bonded to the coupling material 68. The coupling material 68 is a metal pipe made of an electrically conductive material such as stainless steel (for example, SUS304) and is manufactured from a rod material or a pipe material. The rod-shaped electrode section 63a and the operation wire 67 are inserted into the coupling material 68 such that the end faces thereof face each other. The coupling material 68, the functional portion 63, and the operation wire 67 are bonded by a bonding material 69. Similarly, the operation wires 67 can be inserted into the coupling material 68 such that the end faces face each other. The coupling material 68 and the operation wire 67 are bonded by the bonding material 69. Solder, wax made of metal, or the like is used as the bonding material 69.

Subsequently, a method of bonding the operation wire 67 according to the embodiment of the disclosure is explained with reference to the drawings. FIG. 3 is a diagram for explaining a flow of a method of bonding the operation wire 67 according to the embodiment of the disclosure. FIG. 4A to 4E are diagrams for explaining a principle of the method of bonding the operation wire 67 according to the embodiment of the disclosure.

Figure 4A:
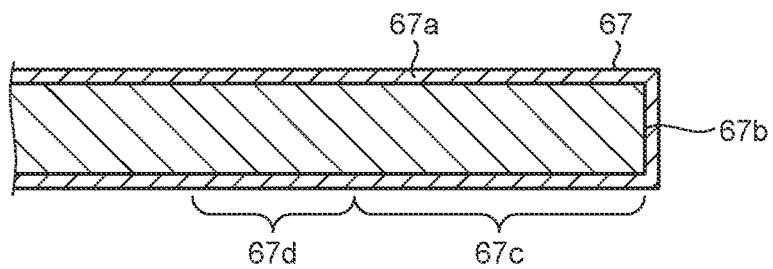
FIGS. 4A to 4E are diagrams for explaining a principle of the method of bonding the operation wire according to the embodiment of the disclosure.
Figure 4B:
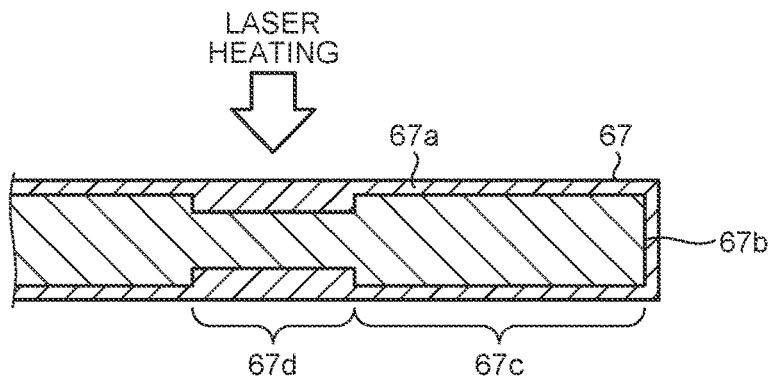

First, an adjacent region of a bonding region of the operation wires 67 is locally heated. Consequently, oxygen in the periphery is combined to generate an oxide in the adjacent region (step S-1). A method of the local heating is not limited but it is preferable to perform the local heating with a laser capable of heating a predetermined region in a short time. It is preferable to perform the local heating while changing conditions as appropriate according to a material, a diameter, and the like of the operation wire 67 to be used. For example, in the case of stainless steel, it is preferable to perform the local heating at 400° C. to 600° C. for approximately 1 to 3 seconds. In the case of nickel titanium, it is preferable to perform the local heating at 600° C. to 900° C. for approximately 1 to 3 seconds. When the operation wire 67 is made of stainless steel, as illustrated in FIG. 4A, an oxide 67a of chromium (a chromium oxide), which is a constituent component of the stainless steel, is formed on the surface of an internal region 67b made of the stainless steel. By the local heating of an adjacent region 67d, as illustrated in FIG. 4B, the oxide 67a in the adjacent region 67d is thicker than the oxide 67a in the other regions. When a stranded wire is used as the operation wire 67, the bonding material 69 penetrates into the inside of the stranded wire as well in the method of related art. It is very difficult to control the hard length. However, in the present embodiment, since the oxide 67a is formed on the surface of a thin wire inside the stranded wire as well by the local heating, the penetration of the bonding material 69 into the inside of the stranded wire can be prevented. It is easy to control the hard length.

Figure 4C:
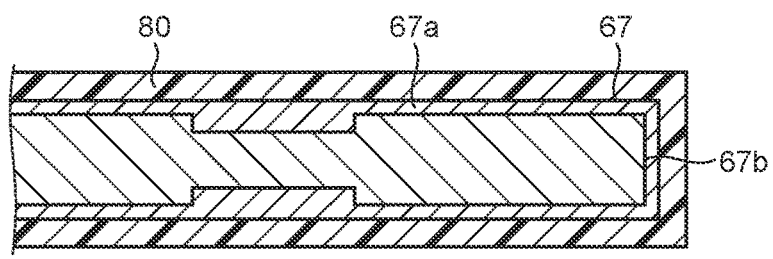
Figure 4D:
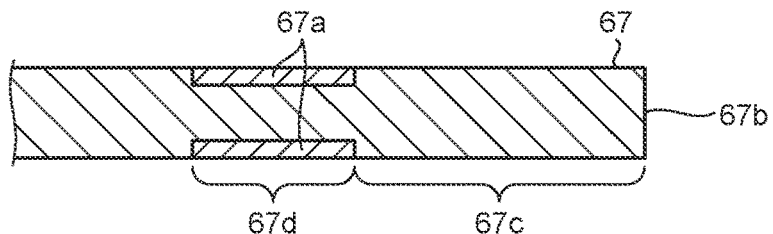

Subsequently, flux is applied to the operation wire 67 (step S-2) and the oxide 67a on the surface of the operation wire 67 is removed (step S-3). As illustrated in FIG. 4C, the bonding region 67c and the adjacent region 67d are covered with flux 80 and the oxide 67a in the bonding region 67c and the adjacent region 67d is removed. By applying the flux 80, the oxide 67a in the bonding region 67c is removed and it is possible to perform bonding by the bonding material 69. The oxide 67a is removed in the adjacent region 67d as well. However, since the oxide 67a in the adjacent region 67d is thicker than the bonding region 67c, the oxide 67a partially remains as illustrated in FIG. 4D. In the present embodiment, since the thickness of the oxide 67a in the adjacent region 67d is large, even when the flux 80 is applied beyond the range of the bonding region 67c, the oxide 67a remains in the adjacent region 67d. Therefore, since the flux 80 can be prevented from flowing out beyond the bonding region 67c, it is easy to control the hard length.

After the oxide 67a in the bonding region 67c is removed, the operation wire 67 is disposed in a through-hole of coupling material 68 (step S-4). An end portion on a side of the bonding region 67c of the operation wire 67 is disposed in contact or close contact with an end portion of another operation wire 67 to be bonded. Alternatively, the operation wire 67 may be disposed in the through-hole of the coupling material 68 before the local heating of the operation wire 67.

After the operation wire 67 is disposed in the coupling material 68, heating of the coupling material 68 is started (step S-5), the bonding material 69a is supplied to the supply hole 68a provided in the coupling material 68, the bonding material 69a is melted by heating, and the melted bonding material 69b is supplied to the gap between the coupling material 68 and the operation wire 67 (step S-6). It is preferable to perform the heating while changing a heating temperature as appropriate depending on the material of the operation wire 67 and the bonding material 69. For example, when a brazing material is used as the bonding material 69, it is preferable to perform the heating at 600° C. to 900° C. and, when solder is used, it is preferable to perform the heating at 300° C. to 500° C.

After the supply of the bonding material 69a, it is checked whether the melted bonding material 69b oozes out from the end portion of the coupling material 68 (step S-7). When there is no oozing of the bonding material 69b (step S-7: No), the supply of the bonding material 69a is continued.

When the bonding material 69b oozes out from the end portion of the coupling material 68 (step S-7: Yes), it is checked whether a wire diameter of the operation wire 67 at the end portion of the coupling material 68 is equal to or larger than a predetermined value (step S-8). The wire diameter described here is in a state in which the operation wire 67 is covered with the bonding material 69b. When the wire diameter does not reach the predetermined value (step S-8: No), the supply of the bonding material 69a is continued.

When the wire diameter reaches the predetermined value (step S-8: Yes), the supply of the bonding material 69a is stopped (step S-9). The heating of the coupling material 68 is stopped to end the bonding.

Figure 4E:
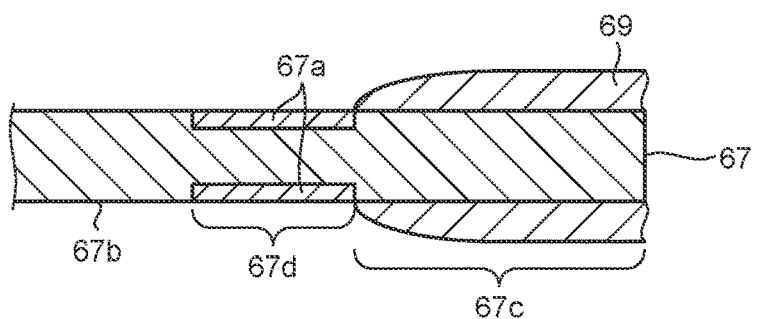

With the method of the present embodiment, as illustrated in FIG. 4E, since the oxide 67a remains in the adjacent region 67d of the bonding region 67c, wet-spreading of the bonding material 69b can be prevented. The oxide 67a in the adjacent region 67d functions as a wet-spreading preventing region for the bonding material 69b.

Figure 5:
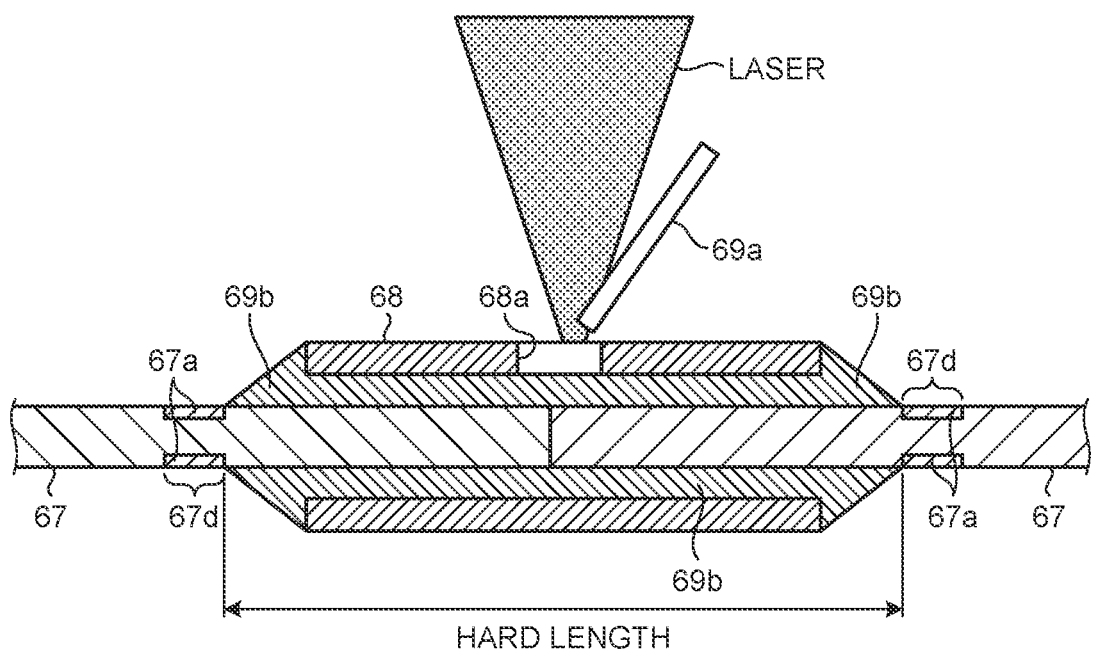
FIG. 5 is a diagram for explaining the method of bonding the operation wire according to the embodiment of the disclosure.
Figure 6A:
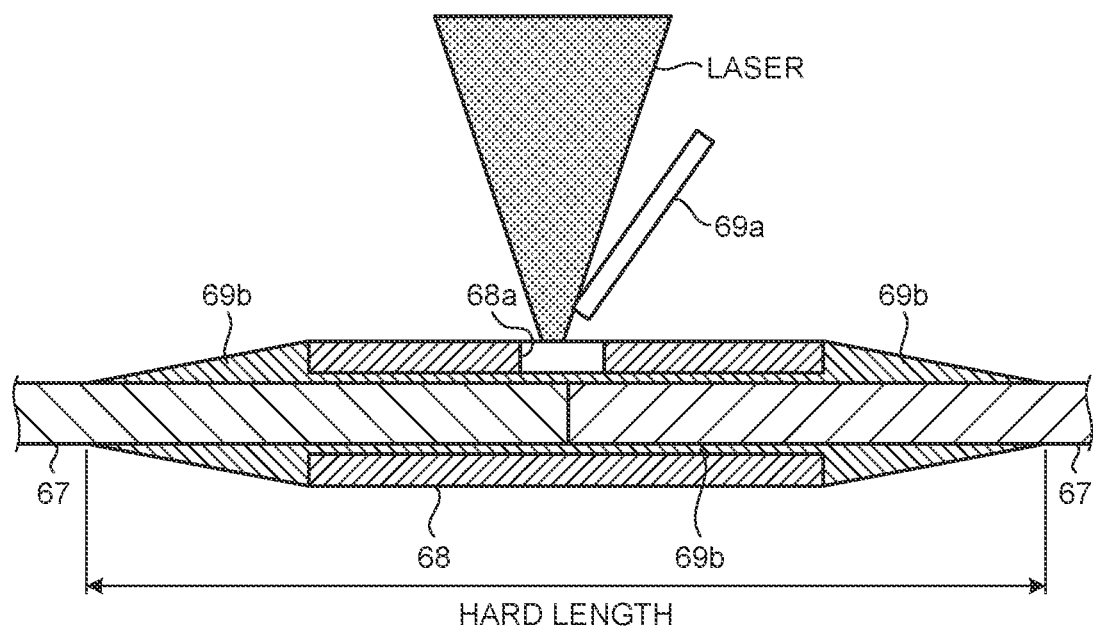
FIGS. 6A and 6B are diagrams for explaining a bonding method of related art.
Figure 6B:
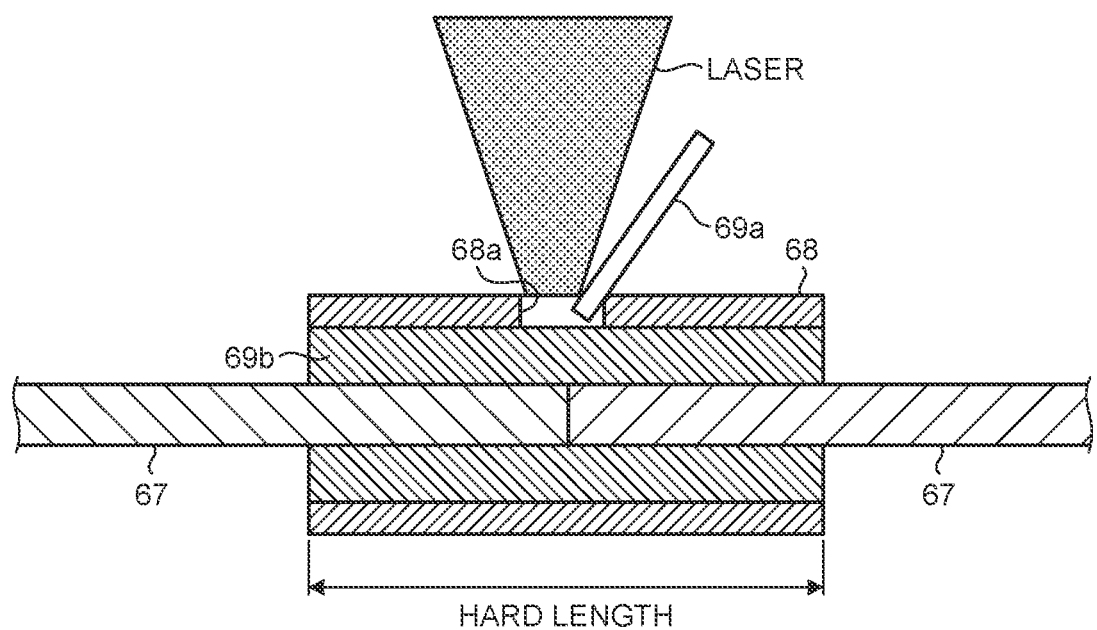

FIG. 5 is a diagram for explaining a method of bonding the operation wire according to the embodiment of the disclosure. As illustrated in FIG. 5, the bonding material 69 supplied from the supply hole 68a of the coupling material 68 oozes out from the end of the coupling material 68 and spreads to the adjacent region 67d where the oxides 67a of the operation wires 67 remains. The bonding material 69 forms a conical fillet having a vertex on a side in contact with the adjacent region 67d. However, according to the present embodiment, the hard length of the bonding region of the operation wires 67 can be easily controlled by locally heating the adjacent region 67d of the bonding region.

In the above explanation, the bonding of the operation wires 67 is explained. However, it is possible to easily control the hard length by bonding the operation wire 67 and another member, for example the functional portion 63, in the same manner.

Further effects and modifications can be easily derived by those skilled in the art. Accordingly, broader aspects of the disclosure are not limited to the specific details and representative embodiment presented and described above. Therefore, various changes can be made without departing from the spirit or the scope of the general inventive concept defined by the appended claims and their equivalents.

Examples

The method of bonding the operation wire according to the present embodiment is explained below based on examples.

Used Members
    Coupling material: material (SUS304), size (outer diameter: 1.03 mm, inner diameter: 0.85 mm, length: 7 mm)
    Operation wire: material (SUS304), size (diameter: 0.62 mm, number of twists: 7×7, length: 100 mm)
    Bonding material: material (silver wax), size (diameter 0.3 mm, length 32 mm)

Example

In a state in which a bonding end portion of an operation wire was brought into contact and inserted into a through-hole of a coupling material, positions 3 mm to the left and the right from the end face of the coupling material was irradiated with a laser and heated at 400° C. to 500° C. for two seconds. Flux was applied to the coupling material and the operation wire and a bonding material melted by heating to 600° C. to 900° C. with a laser was supplied from a supply hole of the coupling material (see FIG. 5). After a brazing material was supplied, the laser irradiation positions was reciprocated three times at speed of 1 mm/sec to positions of 4 mm on the left and the right of the end face of the coupling material to heat the coupling material and the operation wire and the bonding material was wet-spread. After the bonding material hardened, hard lengths from the left and right end portions of the coupling material were measured. A result is illustrated in Table 1. An average of three times of measurement was 1.9 mm.

Comparative Example

The operation wire was bonded with the same members and the same conditions as those in the example except that the operation wire was not locally heated. The hard lengths from the left and right end portions of the coupling material were measured. A result is illustrated in Table 1. An average of three times of measurement was 3.7 mm.

TABLE 1

| | Oxide film generation machining conditions | | | | | Brazing heating conditions | | Results | |
|---|---|---|---|---|---|---|---|---|---|
| Sample No. | Condition Oxide film | Heating time (s) | Heating temperature (° C.) | Heating part | Heating source scanning distance | Heating temperature (° C.) | Brazing material (mm) | Left side hard length (mm) | Right side hard length (mm) |
| 1 | Present | 2 | 400 to 500 | 3 mm | 15 mm | 600 to 900 | 32 | 1.72 | 2.3 |
| 2 | Present | 2 | 400 to 500 | 3 mm | 15 mm | | | 1.97 | 1.92 |

TABLE 1-continued

| | Oxide film generation machining conditions | | | | Brazing heating | | Results | |
| --- | --- | --- | --- | --- | --- | --- | --- | --- |
| | | | | | Heating conditions | | | |
| Sample No. | Condition Oxide film | Heating time (s) | Heating temperature (° C.) | Heating part | Heating source scanning distance | Heating temperature (° C.) | Brazing material (mm) | Left side hard length (mm) | Right side hard length (mm) |
| 3 | Present | 2 | 400 to 500 | 3 mm | 15 mm | | | 2.32 | 1.41 |
| 4 | Absent | — | — | — | — | | | 3.34 | 3.43 |
| 5 | Absent | — | — | — | — | | | 2.56 | 4.72 |
| 6 | Absent | — | — | — | — | | | 3.62 | 4.81 |

In the results described, it was found that, in the example in which an oxide was formed, the hard lengths were suppressed to an average length of 52% as compared with the comparative example.

According to the disclosure, it is possible to realize an endoscope, a hard length of which is controlled, and a medical equipment such as a medical treatment instrument.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of bonding an operation wire used in medical equipment, the method comprising:
   locally heating an adjacent region of a bonding region of an operation wire to generate an oxide in the adjacent region of the operation wire;
   coating the bonding region and the adjacent region with flux to partially remove the oxide in the adjacent region and to remove an oxide in the bonding region;
   inserting a bonding end portion of the operation wire into a through-hole of a coupling material;
   injecting a melted bonding material between the coupling material and the operation wire to integrally bond the coupling material and the operation wire such that oxide remaining in the adjacent region prevents wet-spreading of the bonding material.

2. The method of bonding the operation wire according to claim 1, wherein
   the operation wire is bonded to a functional portion,
   the heating includes locally heating adjacent regions of bonding regions of the operation wire and the functional portion to generate oxides in the adjacent regions of the operation wire and the functional portion,
   the inserting includes inserting bonding end portions of the operation wire and the functional portion into the through-hole of the coupling material, and
   the injecting includes injecting a melted bonding material between the coupling material and the operation wire and the functional portion to integrally bond the coupling material and the operation wire and the functional portion.

3. The method of bonding the operation wire according to claim 1, wherein
   the operation wire is a stainless steel wire, and
   the oxide is chromium oxide.

4. The method of bonding the operation wire according to claim 1, wherein
   the operation wire includes a stranded wire in which a plurality of thin wires are twisted, and
   the oxide is formed on a thin wire surface inside the stranded wire as well.

5. The method of bonding the operation wire according to claim 1, wherein the coupling material is a metal pipe.

6. The method of bonding the operation wire according to claim 1, wherein the local heating is performed by laser irradiation.

7. The method of bonding the operation wire according to claim 1, wherein the bonding material is a brazing material.

8. The method of bonding the operation wire according to claim 1, wherein the medical equipment is an endoscope or a medical treatment instrument.

9. A medical equipment comprising:
   a coupling material having a through-hole;
   an operation wire having an end portion inserted into the through-hole of the coupling material; and
   a bonding material provided between the coupling material and the operation wire to bond the coupling material and the operation wire, wherein the operation wire includes:
      a bonding region on which the bonding material is arranged to bond the coupling material and the operation wire, and
      a wet-spreading preventing region for the bonding material, the wet-spreading preventing region:
         being adjacent to the bonding region,
         being formed from oxide, and
         being a region on which the bonding material is not arranged,
   wherein the wet-spreading preventing region of the operation wire is positioned outside the coupling material, and
   the bonding material has a cone shape extending from an end of the coupling material to the wet-spreading preventing region.

* * * * *